United States Patent
Fields et al.

(10) Patent No.: US 10,207,462 B1
(45) Date of Patent: Feb. 19, 2019

(54) PRINTER ASSEMBLY

(71) Applicants: James Fields, Missoula, MT (US); Michael Manhardt, Missoula, MT (US)

(72) Inventors: James Fields, Missoula, MT (US); Michael Manhardt, Missoula, MT (US); Benjamin Malouf, Loveland, CO (US)

( * ) Notice: Subject to any disclaimer, the term of this patent is extended or adjusted under 35 U.S.C. 154(b) by 774 days.

(21) Appl. No.: 14/641,365

(22) Filed: Mar. 7, 2015

Related U.S. Application Data

(60) Provisional application No. 61/949,899, filed on Mar. 7, 2014.

(51) Int. Cl.
| | |
|---|---|
| *B29C 67/00* | (2017.01) |
| *B29C 64/321* | (2017.01) |
| *B65H 51/10* | (2006.01) |
| *B65H 57/14* | (2006.01) |
| *B29C 64/118* | (2017.01) |

(52) U.S. Cl.
CPC ........ *B29C 67/0085* (2013.01); *B29C 64/321* (2017.08); *B65H 51/10* (2013.01); *B65H 57/14* (2013.01); *B29C 64/118* (2017.08)

(58) Field of Classification Search
CPC ... B29C 64/307; B29C 64/321; B29C 64/343; B29C 64/00; B29C 64/118; B29C 64/106
See application file for complete search history.

(56) References Cited

U.S. PATENT DOCUMENTS

| | | | | |
|---|---|---|---|---|
| 6,302,309 | B1* | 10/2001 | Drader ............... | B29C 47/0016 |
| | | | | 222/146.5 |
| 8,926,882 | B2* | 1/2015 | Batchelder .......... | B29C 67/0055 |
| | | | | 264/308 |
| 9,321,609 | B2* | 4/2016 | Koop .................... | B65H 51/10 |
| 9,855,679 | B2* | 1/2018 | Batchelder ........... | B65H 49/322 |
| 2005/0279819 | A1* | 12/2005 | Stava ................... | B23K 9/1062 |
| | | | | 235/375 |
| 2007/0003656 | A1* | 1/2007 | LaBossiere ........... | B33Y 30/00 |
| | | | | 425/375 |
| 2009/0263582 | A1* | 10/2009 | Batchelder ............. | C22C 43/00 |
| | | | | 427/256 |
| 2009/0273122 | A1* | 11/2009 | Batchelder .......... | B29C 47/0014 |
| | | | | 264/401 |
| 2009/0274540 | A1* | 11/2009 | Batchelder ............ | B65H 51/00 |
| | | | | 414/431 |
| 2011/0076495 | A1* | 3/2011 | Batchelder .......... | B29C 47/0038 |
| | | | | 428/369 |
| 2014/0120196 | A1* | 5/2014 | Schmehl ................ | B29C 47/92 |
| | | | | 425/190 |
| 2015/0076739 | A1* | 3/2015 | Batchelder ............ | B33Y 10/00 |
| | | | | 264/401 |
| 2015/0093588 | A1* | 4/2015 | Sadusk .................. | B29C 64/40 |
| | | | | 428/480 |
| 2015/0137402 | A1* | 5/2015 | Schmehl ................ | B33Y 10/00 |
| | | | | 264/39 |
| 2016/0236409 | A1* | 8/2016 | Armani ................. | B29C 47/12 |
| 2016/0361873 | A1* | 12/2016 | Maier ................... | B29C 64/106 |
| 2017/0136707 | A1* | 5/2017 | Batchelder ............ | B33Y 30/00 |

* cited by examiner

*Primary Examiner* — Jason L Lazorcik
(74) *Attorney, Agent, or Firm* — Brian J. Pangrle

(57) ABSTRACT

A material transport assembly for a printer assembly can include a toothed component; a drive for rotation of the toothed component; a material guide; and a biasing component that biases the material guide in a direction toward the toothed component.

14 Claims, 11 Drawing Sheets

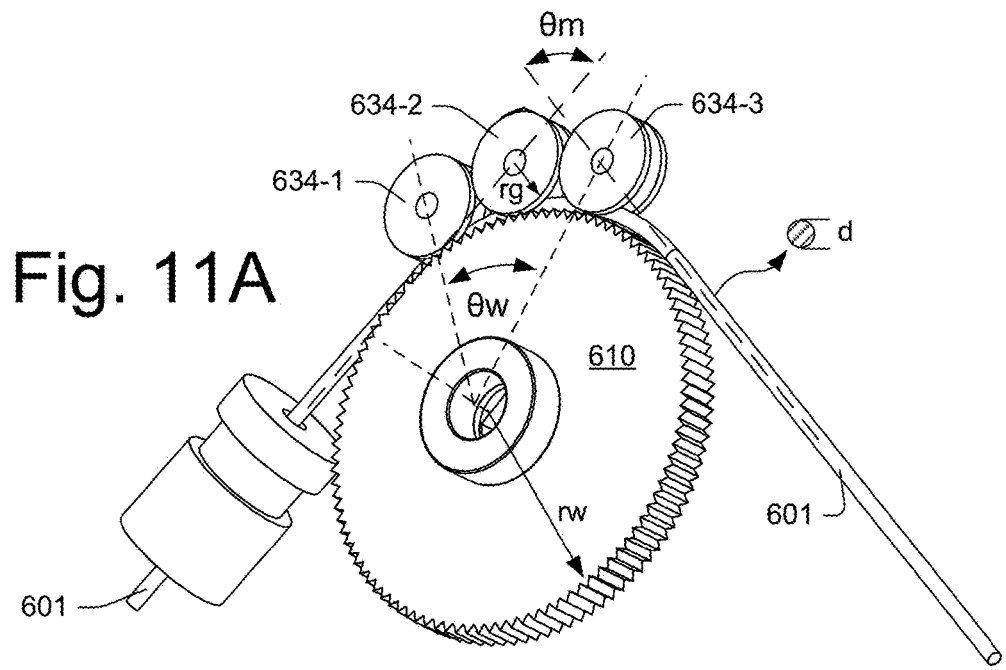
Fig. 11A
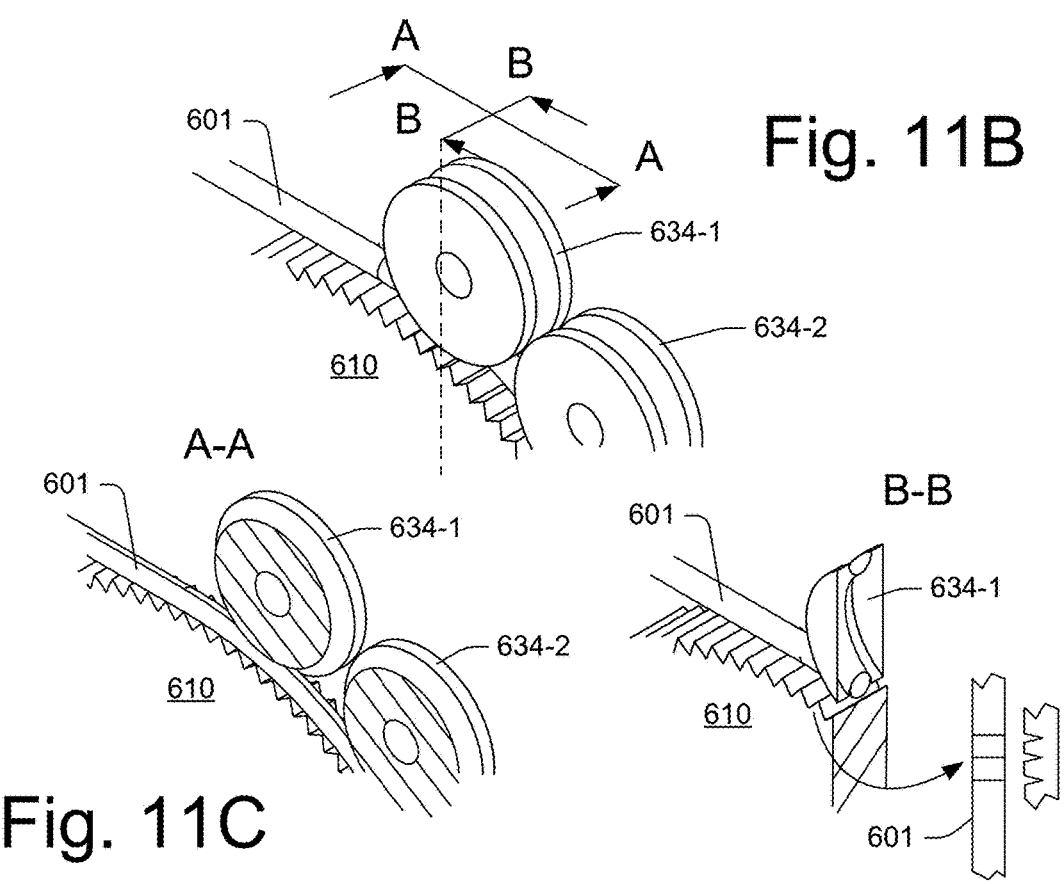
Fig. 11B
Fig. 11C
Fig. 11D

PRINTER ASSEMBLY

RELATED APPLICATION

This application claims the benefit of and priority to a U.S. Provisional Application having Ser. No. 61/949,899, filed 7 Mar. 2014, which is incorporated by reference herein.

BACKGROUND

An assembly may include a head that is positionable, for example, in one or more dimensions. As an example, a head may emit material, emit energy, etc. Various equipment, technologies, techniques, etc., are described herein that may optionally be implemented as part of an assembly, a printer, a printer assembly, etc.

BRIEF DESCRIPTION OF THE DRAWINGS

Features and advantages of the described implementations can be more readily understood by reference to the following description taken in conjunction with the accompanying drawings.

FIGS. 11A, 11B, 11C and 11D are a series of views of examples of portions of an example of an assembly.

DETAILED DESCRIPTION

Figures 1A, 1B:
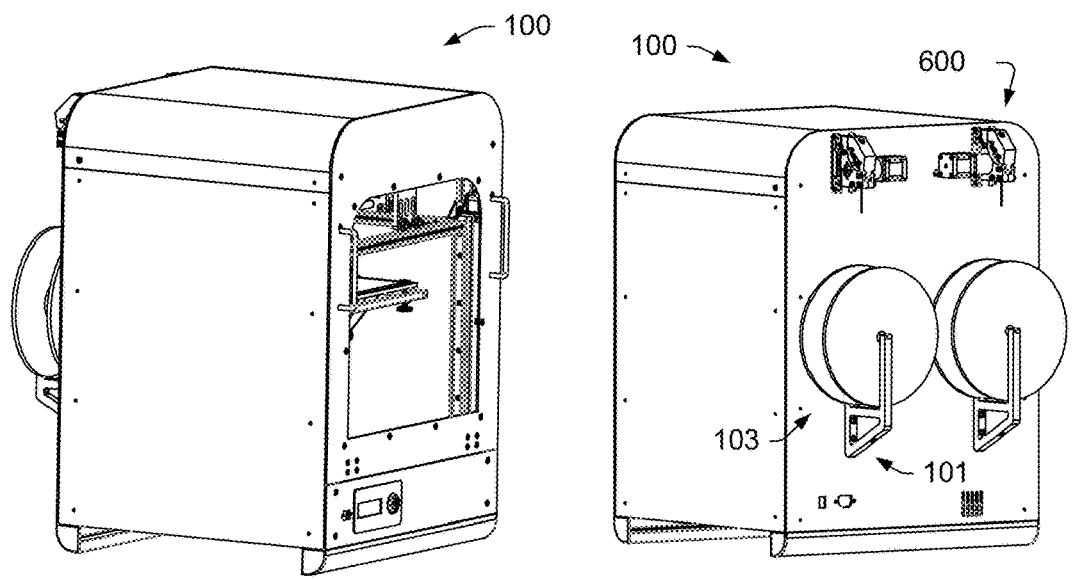
FIGS. 1A, 1B and 1C are a series of perspective views of an example of an assembly.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As mentioned, an assembly may include a head that is positionable, for example, in one or more dimensions and, as an example, a head may emit material, emit energy, etc.

As an example, an assembly may be configured with respect to a scale of use. For example, a printer assembly may be configured to a scale suitable for constructing buildings (e.g., for human habitation, etc.). As an example, a printer assembly may be configured to a scale suitable for nanotechnology tasks. As an example, a printer assembly may be configured to a scale suitable for MEMS tasks. As an example, the term MEMS may be associated tasks, movements, material transfers, components, etc. having a dimensional scale of the order of about 1 micrometer to about 100 micrometers (e.g., 0.001 to 0.1 mm) or more (e.g., of the order of several millimeters, etc.).

As an example, an assembly may be referred to as a fabricator assembly, an automated fabrication machine, automated fabricator, etc., for example, depending on tasks for which it is configured. Where an assembly is configured for transferring material, delivery of energy, absorption of material, absorption of energy, etc. (e.g., via positioning a head or heads in multiple dimensions), optionally without "fabrication" of an object, an assembly may be described, for example, with respect to a function or functions (e.g., an automated nutrient delivery assembly, an automated mixing assembly, an automated heater assembly, an automated cooler assembly, etc.).

As to the construction of buildings, which may include contour crafting, as an example, a building may be built up by depositing material(s) layer by layer. As an example, construction may include movement of one or more pieces.

As an example, a printer assembly may be implemented to deposit material, emit energy, etc. where such material, energy, etc. may participate in, activate, etc. one or more chemical reactions, which may include biological chemical reactions. For example, consider an array of wells that may be filled with particular materials. In such an example, a printer assembly may deposit material in one or more of the wells, may emit energy to one or more of the wells, etc. As an example, energy may be energy to activate a reaction, to halt a reaction, to agitate material (e.g., stir, mix, etc.), etc.

As an example, a printer assembly may be a gantry or include a gantry (or gantries). As an example, a gantry may be operatively coupled to a head (e.g., or heads), for example, such that the head may be positioned by the gantry. As an example, a gantry may be configured for movement in one or more spatial dimensions (e.g., consider one or more spatial dimensions in Cartesian coordinates x, y, z; in cylindrical coordinates r, $\theta$, z; etc.).

As an example, a head may be configured to emit material, emit energy, etc. As an example, a head may be fed via a feed line a material that may then be emitted by the head. In such an example, the head may include a heating element that can transfer heat to the material, for example, to change one or more characteristics of the material. As an example, a head may be fed a material in a first state at a first temperature and heat the material via a heating element of the head to a second temperature to transition the material from the first state to another state (e.g., a second state). In such an example, the first state may be a solid state, crystalline state, etc. and the second state may be a semi-solid state, a molten state, a non-crystalline state, a fluid state, etc. For example, a head may lower the viscosity of material (e.g., by transferring energy to the material) to thereby promote flow of the material from the head.

As an example, an assembly may include a head or heads that can emit a plurality of materials (e.g., via one or more ports, nozzles, etc.). As an example, a material may be a support material. As an example, a material may be a parent material. As an example, a build (e.g., fabrication of an object, etc.) may involve two or more materials. In such an example, one of the materials may be a parent or model material that forms a built object and another one of the materials may be a support material that may, for example, be deposited to support one or more over hangs, drafts, etc. within the built object. As an example, a support material may be a wax-like material that can be removed (e.g., manually, via a heating process, via a chemical process, via a fluid jet, etc.). As an example, one or more materials may be bio-degradable.

As an example, a head may include an electrical resistance heater, an electromagnetic heater (e.g., IR, UV, RF, induction, microwave, laser, etc.), a friction heater, a radiological heater (e.g., via radioactive decay, nuclear decay or radioactivity), etc. As an example, a head may emit energy that may initiate, further, etc. one or more chemical reactions. For example, a head may emit UV energy that initiates a chemical chain reaction (e.g., polymerization, etc.). As an example, a head may emit energy to melt a material and emit energy to initiate a chemical reaction. In such an example, consider material provided as including monomer and initiator where heat energy acts to melt the material to promote flow and where UV energy causes the initiator to promote polymerization of the melted monomer.

As an example, a head may include a cutter, which may be or include one or more of a fluid cutter (e.g., gas and/or liquid, optionally including particulate matter), a mechanical cutter, a beam cutter (e.g., electron beam, laser beam, etc.), etc. As an example, a head may include energy emission circuitry for emission of energy, for example, to weld, to braze, etc. As an example, a head or heads may emit material such as, for example, brazing material (e.g., filler, etc.), solder, flux, etc.

As an example, a printer assembly may be part of a multidimensional printer. For example, consider a 3D printer that may implement a one or more processes for making a 3D object, for example, from a digital model (e.g., a file, data, instructions, etc.). As an example, a controller may control one or more components of a multidimensional printer as part of a process to make an object. Such a controller may include a processor or microcontroller (e.g., ARM-based, ARC-based, etc.) that can execute instructions that may be stored in memory of the controller and/or memory accessible by the controller, communicated to the controller (e.g., via wire(s) and/or wirelessly), etc.

As an example, multidimensional printing may include using an additive process, for example, where successive layers of material deposited. As mentioned, as an example, an assembly may include one or more cutters, which may be mechanical, beam-based, etc. Such an assembly may optionally remove material (e.g., as a subtractive process). As an example, an assembly may include features for an additive process, features for a subtractive process or features for an additive process and features for a subtractive process.

As an example, a method may include melting and/or softening material via one or more techniques such as, for example, selective laser melting (SLM), direct metal laser sintering (DMLS), selective laser sintering (SLS), fused deposition modeling (FDM), etc. As an example, a method may include curing material using a technique such as, for example, stereolithography (SLA). As an example, a method may include laminated object manufacturing (LOM), for example, where layers of material (e.g., organic, synthetic, etc.) may be cut to shape and joined together.

As an example, an assembly may implement Precision Additive Fabrication Technology (PAFT). As an example, an assembly may include one or more linear lead screws, which may be one or more components of a gantry. As an example, an assembly may be or include a machined billet aluminum x/y gantry. As an example, an assembly may include anti-backlash lead screw actuation features.

As an example of a linear lead screw, consider a Thomson linear lead screw (e.g., consider a GLIDESCREW™ linear lead screw). As an example, a linear lead screw may be provided as an assembly (e.g., a sub-assembly) with a lead screw and a linear bearing. As an example, such an assembly may include a glide nut housing, a lubrication block, one or more radial bearings, and a glide screw. As an example, a housing may include a bore, which may be a threaded bore.

As an example, an assembly may include x/y actuation via lead screws with anti-backlash features supported by machined billet aluminum carriers. As an example, such an assembly may be configured for a range of actuation speeds, for example, consider a range of linear actuation speeds from about 1 mm/s to about 350 mm/s. As an example, such an assembly may be configured for x/y linear actuation resolution of the order of several micros (e.g., about 1 microns to about 10 microns). As an example, such an assembly may include z actuation via a lead screw, for example, to provide a linear actuation speed of the order of about tens of mm/s with, for example, a z linear actuation resolution less than about 1 micron. While some examples are given with respect to numerical values, as an example, speeds, resolutions, etc., may depend on scale of an assembly and the use thereof.

As an example, an assembly may include one or more motors, which may be, for example, stepper motors, synchro-motors, etc. As an example, a drive mechanism may be a pneumatic drive mechanism, a hydraulic drive mechanism, or other type of drive mechanism. As an example, a drive mechanism may be powered by electricity, compressed fluid, combustible fuel, etc. As an example, a stepper motor may include features for stepping at angular increments (e.g., consider a step angle of about 1 degree to about 2 degrees, optionally with micro-stepping at about one-half to about one sixty-fourth of a step angle). As an example, a step motor or other type of drive may act to rotate a lead screw.

As an example, an assembly may include one or more extruders that may include features for moving filament (e.g., in one or more directions).

As an example, an assembly may include a heated bed. As an example, an assembly may include features for extrusion of multiple materials (e.g., multiple extruders, multiple heads, etc.). As to some examples of materials, consider one or more of ABS, TAULMAN™ nylon (taulman3D, LLC), PET, PLA, PVA, HIPS, polycarbonate. As an example, an assembly may include one or more spools, for example, for carrying material (e.g., one or more filaments). As an example, an assembly may include an extruder configured to move material in the form of a filament where, for example, the filament may have a cross-sectional profile or cross-sectional profiles such as, for example, circular, oval, polygonal, etc.

As an example, an assembly may include features for memory card-based input of printing instructions. As an example, an assembly may include a ViKI panel. As an example, an assembly may include an Azteeg control board (e.g., X3, etc.). As an example, a control board may include a microcontroller (e.g., consider an Atmel ATmega2560 microcontroller, etc.). As an example, a microcontroller may be RISC-based and include ISP flash memory, SRAM, EEPROM, I/O lines, registers, a real time counter, flexible timer/counters with compare modes, PWM circuitry, USARTs, a byte oriented 2-wire serial interface, a multi-channel N-bit ND converter, and a JTAG interface (e.g., consider a throughput of about 16 MIPS at about 16 MHz operating at about 4 to 6 volts).

Figure 1C:
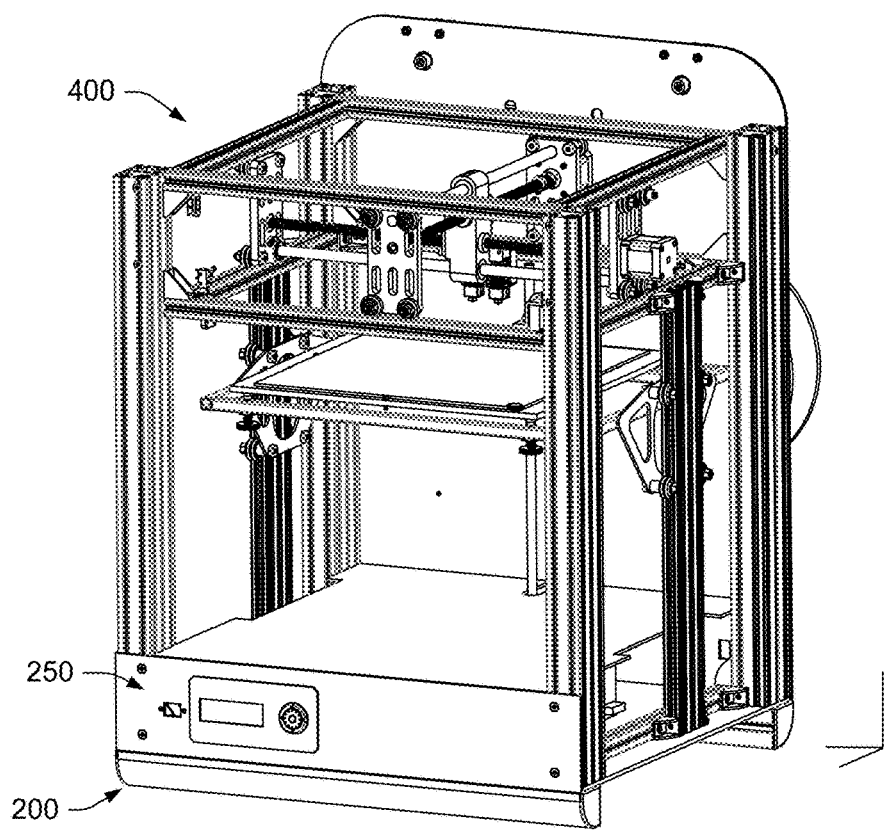

FIGS. 1A, 1B and 1C show an example of a printer 100 that includes a frame assembly 200, control circuitry 250, a movable platform assembly 300, a gantry assembly 400 and one or more material transport assemblies 600. The printer 100 also includes one or more spindles 101 that can carry one or more spools 103 that may carry material. For example, material carried by one of the one or more spools 103 mounted on one of the one or more spindles 101 may be transported by one of the one or more material transport assemblies 600. Such material may be received by a head carried by the gantry assembly 400. As shown, the printer 100 may include sides (e.g., a housing) such that a chamber is formed, which may be accessible via a door. Such a chamber may, for example, be controlled as to gas composition, humidity, temperature, lighting, etc. (e.g., via control elements of the printer 100, via supply of gas, moisture, lighting, etc., etc.). Various components of the printer 100 illustrated in FIGS. 1A, 1B and 1C may be described with respect to a three-dimensional coordinate system (e.g., a Cartesian x, y, z coordinate system). As an example, the printer 100 may include a power supply (e.g., one or more batteries, etc.) and/or may include a cable, wires, etc. for receipt of power from one or more power sources. As an example, electricity may be supplied to printer 100 to operate one or more motors, one or more control circuits, one or more control elements, etc.

Figure 2:
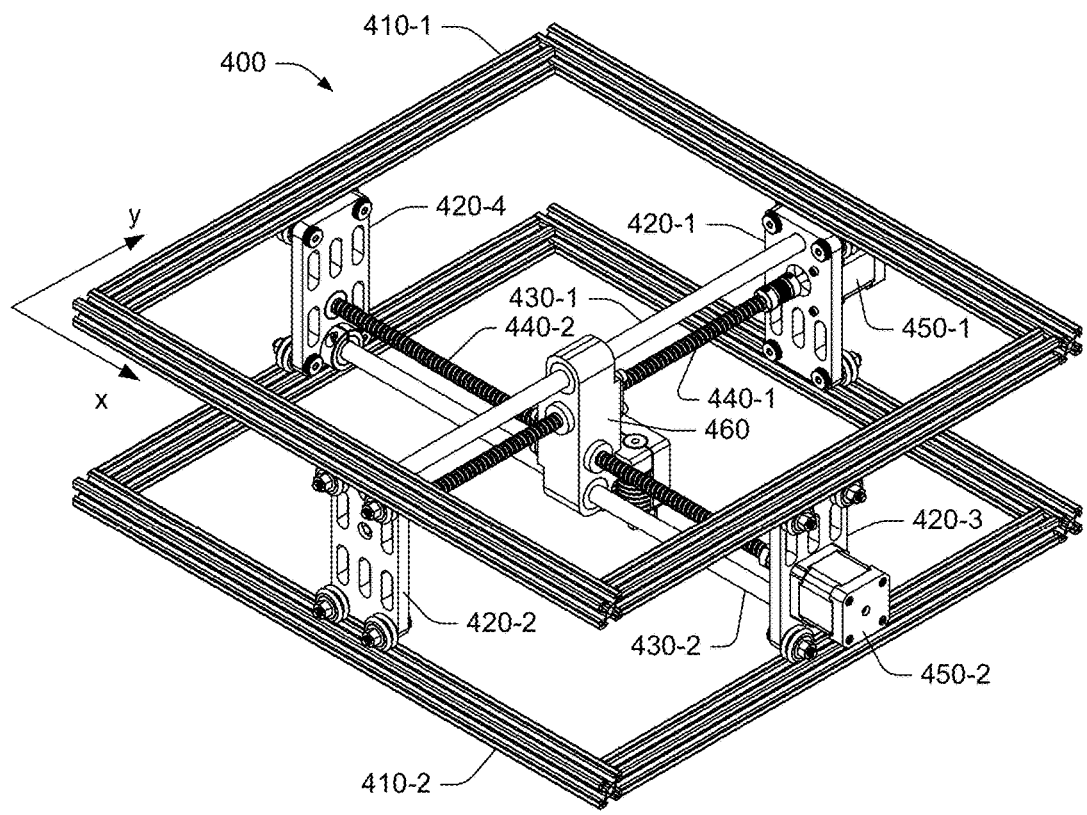
FIG. 2 is a perspective view of an example of an assembly.

FIG. 2 shows a perspective view of an example of the gantry assembly 400. In the example of FIG. 2, the gantry assembly 400 includes rails 410-1 and 410-2 that support and guide an x assembly and a y assembly.

In the example of FIG. 2, the x assembly includes plates 420-1 and 420-2, a rod 430-1, a screw 440-1 and a drive 450-1 that can rotate the screw 440-1. In the example of FIG. 2, the y assembly includes plates 420-3 and 420-4, a rod 430-2, a screw 440-2 and a drive 450-2 that can rotate the screw 440-2.

In the example of FIG. 2, a carrier 460 is carried by the x assembly and the y assembly. In such an example, rotation of the screw 440-1 causes the carrier 460 to translate in the x direction and rotation of the screw 440-2 causes the carrier 460 to translate in the y direction. As may be appreciated, rotation of the screw 440-1 causes the plates 420-3 and 420-4 to translate with respect to the rails 410-1 and 440-2 and rotation of the screw 440-2 causes the plates 420-1 and 420-2 to translate with respect to the rails 410-1 and 410-2.

Figures 3A, 3B:
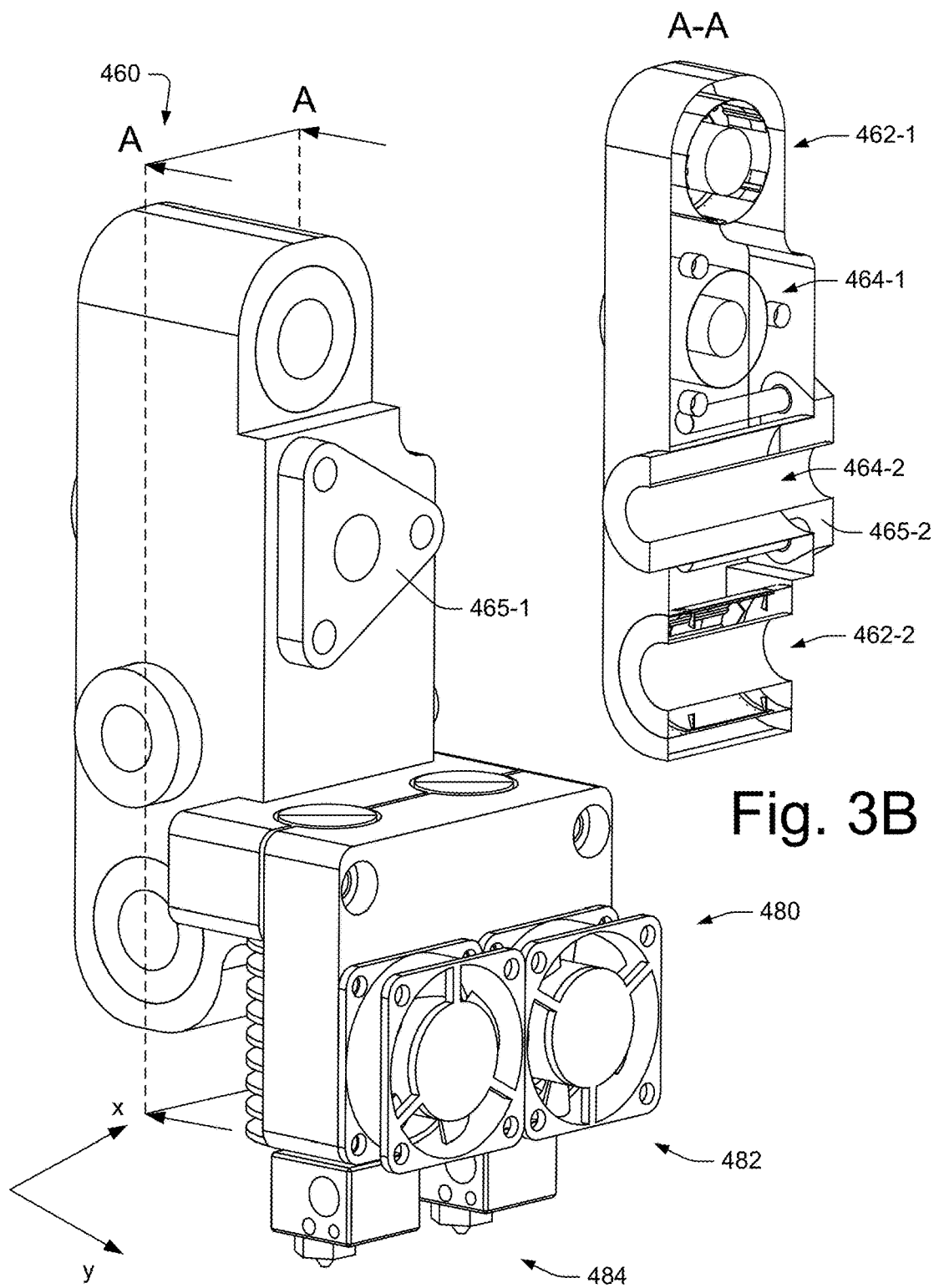
FIGS. 3A and 3B are a perspective view and a cutaway view of an example of an assembly.
Figure 4A:
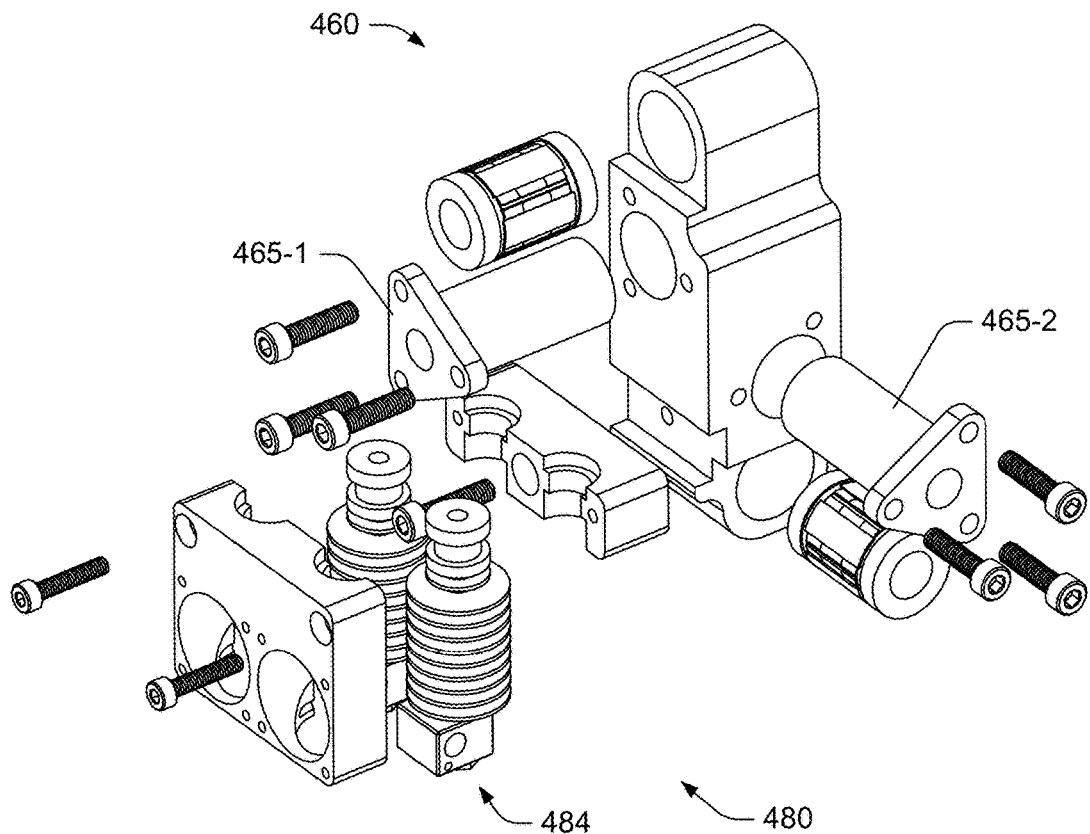
FIGS. 4A and 4B are an exploded view of an example of an assembly and a block diagram of examples of heads.

FIGS. 3A, 3B and 4A show an example of the carrier 460 as including a head 480, which may be configured to heat material and to dissipate heat. For example, heat generated at heater blocks 484 may be dissipated, at least in part, via fluid movers 482. In such an example, a heating zone or heating zones may be established, for example, to heat material at the heater blocks 484 while reducing transfer of heat to material conduits that lead to the heater blocks 484. For example, material conduits may be fitted with heat transfer features such as fins where the fluid movers 482 move fluid across the fins to increase heat transfer from the fins to the moved fluid to thereby remove heat from the material conduits and material (or materials) transported therein. As an example, the control circuitry 250 may control one or more features of the carrier 460 and, for example, position of the carrier 460. As an example, the control circuitry 250 may control one or more material transport assemblies that transport material to the head 480. As shown in FIG. 4A, the head 480 includes openings (e.g., upper openings) that can receive material. The head 480 also includes openings (e.g., lower openings) that can emit material.

As an example, a heater may provide for heating material. As an example, a heater may provide heat energy that can cause heating of material to a desired temperature. For example, consider a temperature in a range from about 50 degrees C. to about 600 degrees C. As an example, where a polymeric material is to be heated, a heater may provide heat energy that can cause heating of material to a desired temperature that may cause the polymeric material to become flowable. For example, depending on the type of polymeric material, temperatures may be in a range from about 170 C to about 400 C; noting that particular types of polymeric materials may be used and heated to lesser or greater temperatures. As an example, a composite material may include polymeric material and at least one other type of material. Such a material may be heated via a heater (e.g., as associated with a head, etc.).

In the example of FIGS. 3A, 3B and 4A, the carrier 460 is shown as including linear ball bushings 462-1 and 462-2 (e.g., rolling element bushings) and radial bearings 464-1 and 464-2, which may include anti-backlash features 465-1 and 465-2 and, for example, one or more lubricant blocks, etc.

Figure 4B:
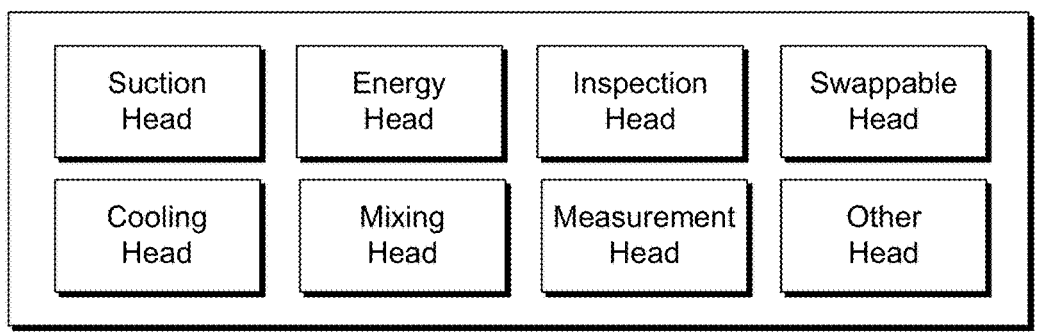

FIG. 4B shows some examples of heads including a suction head, a cooling head, an energy head, a mixing head, an inspection head, a measurement head, a swappable head and one or more other heads. As an example, a carrier may carrier a suction head configured to apply suction to material (e.g., solid, liquid, gas, multiphase, etc.). As an example, a carrier may carrier a cooling head that can absorb energy from a material, for example, to cool that material. As an example, a carrier may carrier an energy head, for example, that can emit energy (e.g., thermal, nuclear, magnetic, electric, electromagnetic, etc.). As an example, a carrier may carrier a mixing head that can, for example, mix a material, mix materials, etc. (e.g., via mechanical, ultrasound, etc.). As an example, a carrier may carrier an inspection head that can, for example, inspect material visually, sonically, electrically, magnetically, electromagnetically, etc. As an example, a head may include mechanical components, electrical and/or magnetic components, etc. As an example, a head may be controllable via a control mechanism coupled to a controller, etc. For example, a controller may control position of a head an operation of a head, optionally based on information via one or more sensors, etc.

As an example, a carrier may carrier a measurement head, for example, for measuring one or more characteristics of material, materials, etc. For example, a measurement head may determine where a previously deposited material is positioned, which may be part of an adjustment/feedback loop for locating the head or another head that may be configured to deposit additional material, remove material, etc. As an example, a measurement head may include one or more circuits for performing, for example, spectroscopy (e.g., to determine one or more amounts, characteristics, etc. of material or materials). For example, where a chemical reaction may occur, a measurement head may emit energy and receive a portion of that energy in return (e.g., according to one or more spectroscopic techniques).

As an example, an assembly may include one or more bays that include heads where, for example, a gantry may position a carrier for purposes of head removal and head addition. As an example, a carrier may be configured to carry one or more heads. As an example, one or more of the various example heads may be swappable heads. As an example, a carrier may be configured to swap heads, for example, optionally in cooperation with one or more other components of an assembly (e.g., an active bay that includes an arm that attaches to a head of a carrier for removal of that head, an active bay that includes a mechanism that positions a head with respect to a carrier to couple that head to the carrier, etc.).

As an example, a carrier may include one or more sensors, emitters, etc. As an example, a carrier may include one or more reflective surfaces. As an example, a carrier may include one or more features that may assist with positioning of the carrier, optionally in a feedback loop. For example, while a lead screw may position a carrier to a particular position within a positional tolerance without feedback, feedback as to the position of the carrier may allow for finer positioning. As an example, a beam may be reflected off one or more surfaces of a carrier where reflected energy of the beam may be analyzed to determine a distance associated with the carrier. As an example, an assembly may position a carrier, a head, etc. based at least in part on a positioning mechanism, system, etc. that may act to control one or more lead screws.

As an example, a motor or motors may include one or more sensors. For example, consider a rotational position sensor that may be configured to determine an amount of rotation of a shaft of a motor. Such a mechanism may optionally be a feedback mechanism. For example, a control signal may be communicated to a motor to rotatable step a shaft of the motor. In such an example, a mechanism may be included in a control loop that measures an actual amount by which the shaft of the motor rotated. Such information may be used to adjust the shaft, for example, by a communicating an appropriate adjustment control signal to the motor.

Figure 5:
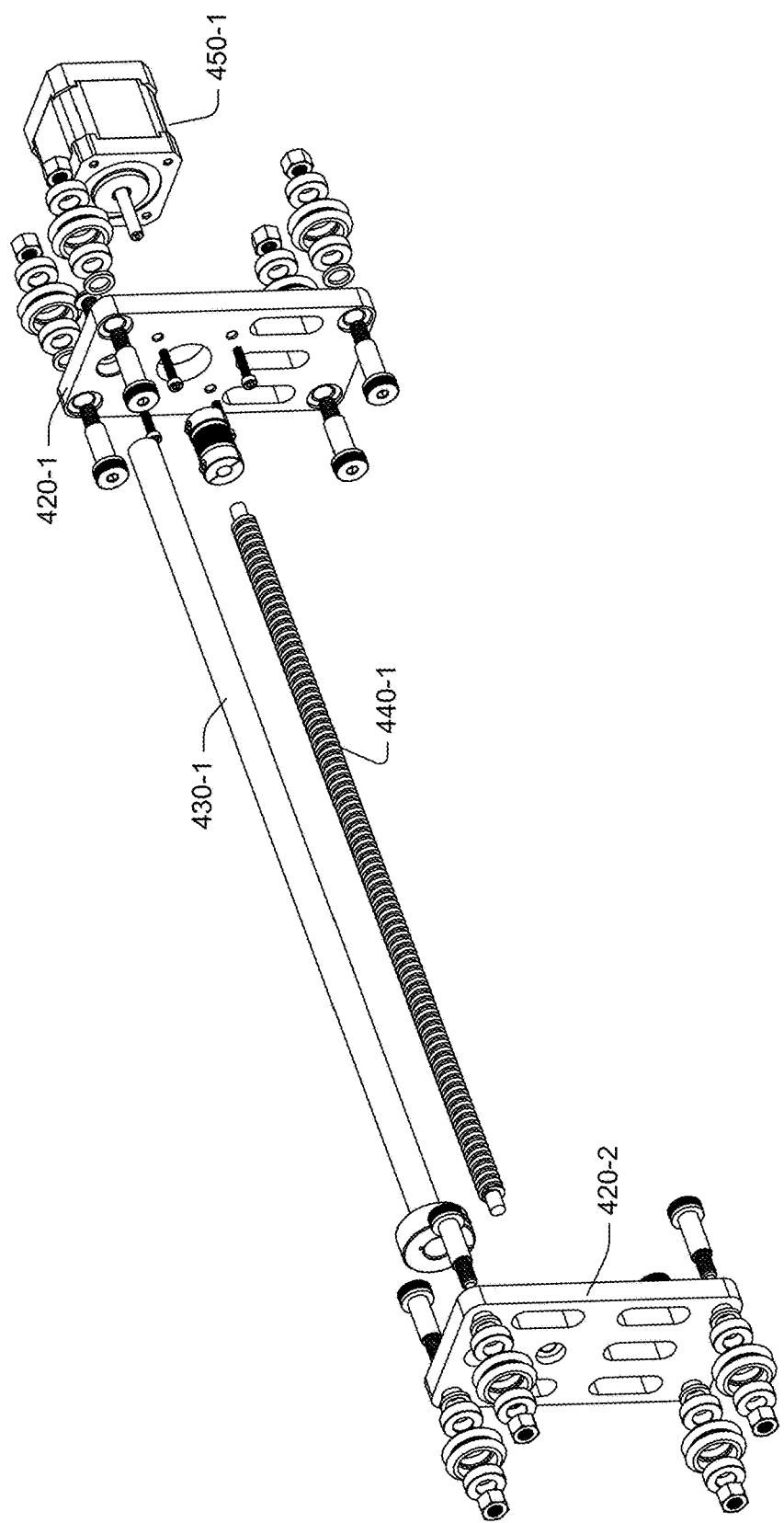
FIG. 5 is an exploded view of an example of an assembly.

FIG. 5 shows an exploded view of an example of the x assembly of FIG. 2. As shown, the rod 430-1 and the lead screw 440-1 are supported by the plates 420-1 and 420-2 where the lead screw 440-1 may be rotated via the drive 450-1 (e.g., electric motor), which may be operatively coupled to the plate 420-1. As an example, the control circuitry 250 may control operation of the drive 450-1 (e.g., to rotate the lead screw 440-1).

Figure 6C:
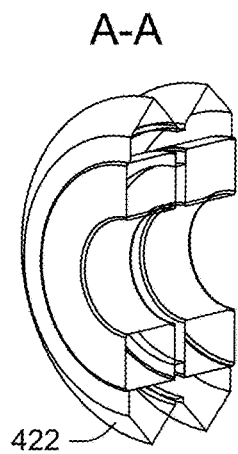
FIGS. 6A, 6B and 6C are a series of views of an example of a portion of an assembly.
Figure 6B:
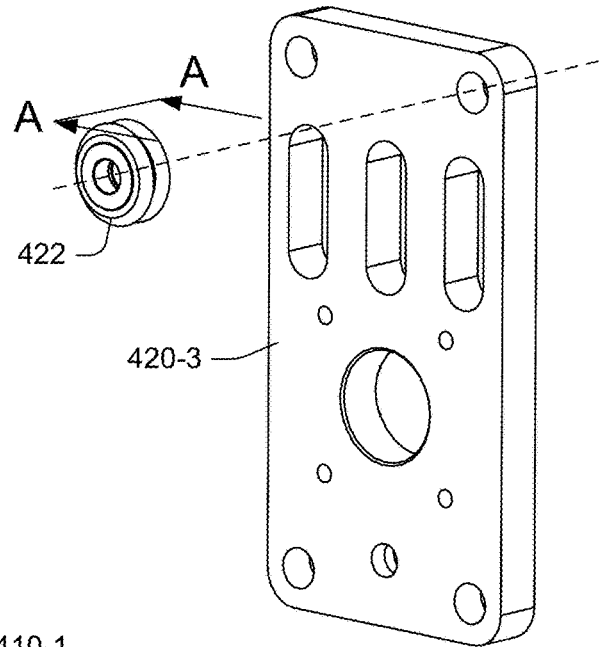
Figure 6A:
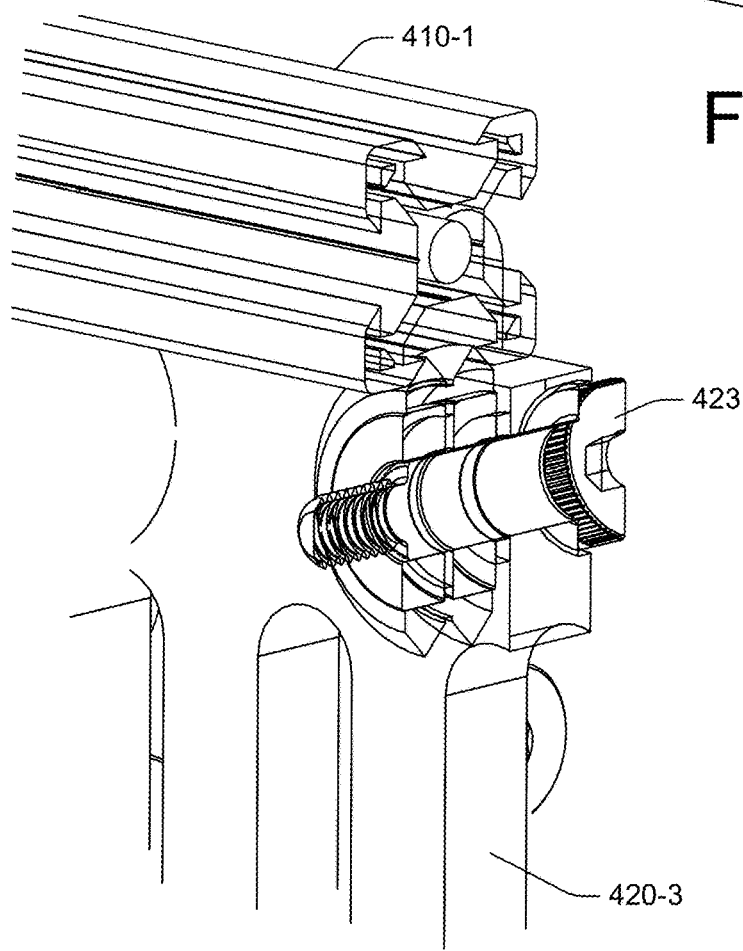

FIG. 6A shows the plate 420-3 with respect to a portion of the rails 410-1 where a wheel 422 is operatively coupled to the plate 420-3 via an axel 423. FIG. 6B shows the plate 420-3 and the wheel 422 and FIG. 6C shows a cutaway view of the wheel 422. As an example, the wheel 422 may include rolling elements, for example, bearings such as ball bearings. As an example, the wheel 422 may include surfaces disposed at angles, for example, to be guided by surfaces disposed at angles of the rails 410-1. As an example, the angles may be about 45 degrees (e.g., +45 degrees and −45 degrees with respect to a plane perpendicular to the axel 423).

Figure 7A:
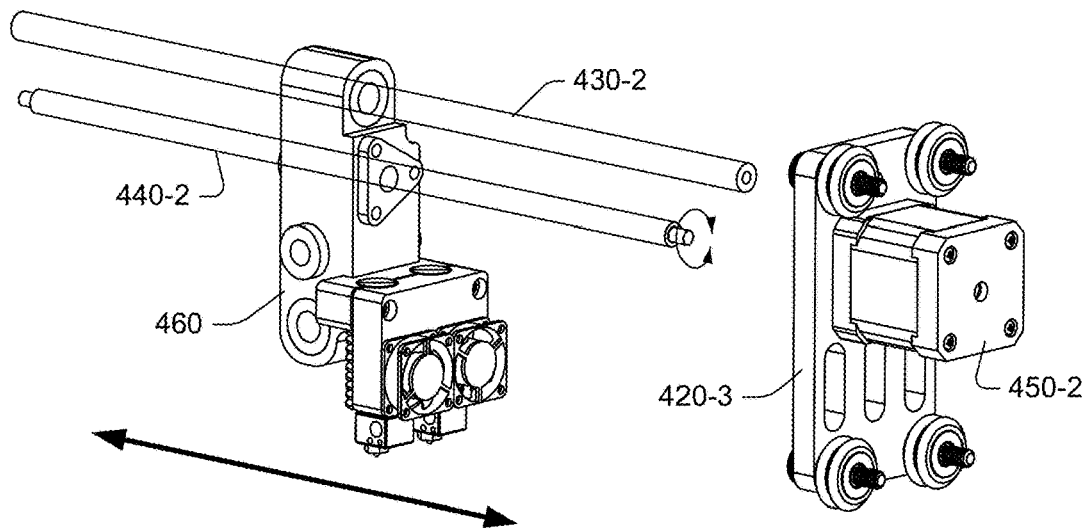
FIGS. 7A and 7B are a perspective view of an example of an assembly and a block diagram of an example of a method.

FIG. 7A shows a partially exploded view of the plate 420-3, the rod 430-2, the screw 440-2, the motor 450-2 and the carrier 460. As indicated, rotation of the screw 440-2 can cause the carrier 460 to translate.

Figure 7B:
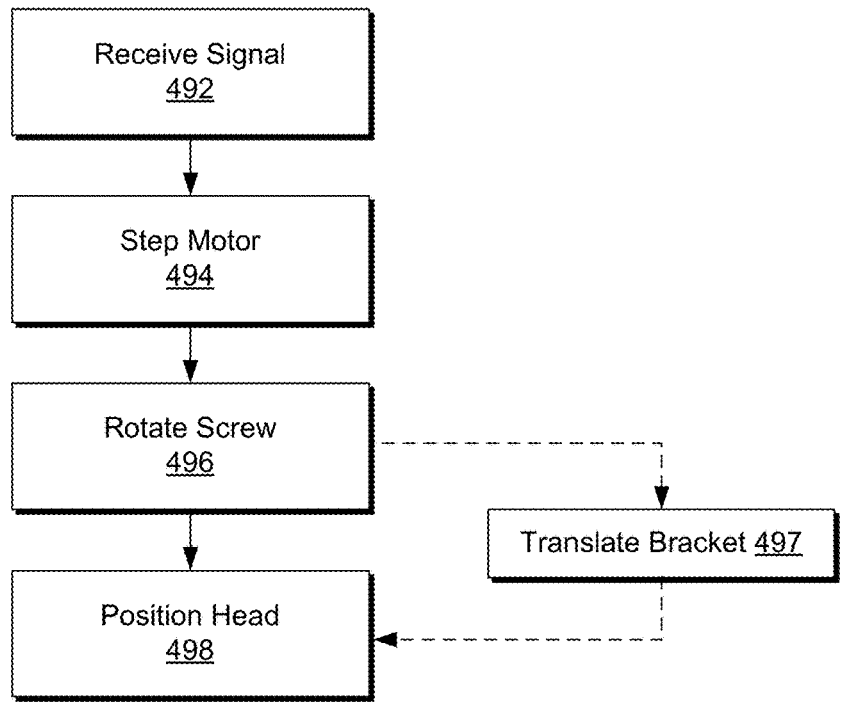

FIG. 7B shows an example of a method 490 that includes a reception block 492 for receiving a signal, a step block 494 for stepping a motor according to the signal, a rotate block 496 for rotating a screw responsive to stepping the motor and a position block 498 for positioning a carrier responsive to rotating the screw. As an example, the method 490 may include a translate block 497 for translating a plate, for example, responsive to positioning of the carrier (see, e.g., the gantry 400 of FIG. 2, etc.). As mentioned, an assembly may optionally include a feedback mechanism, for example, for positioning a carrier, a head, etc. As an example, the method 490 may be implemented by the printer 100. For example, the control circuitry 250 may emit a signal that is received by a motor that can rotate a screw to cause a carrier to move (e.g., to a particular position).

Figure 8:
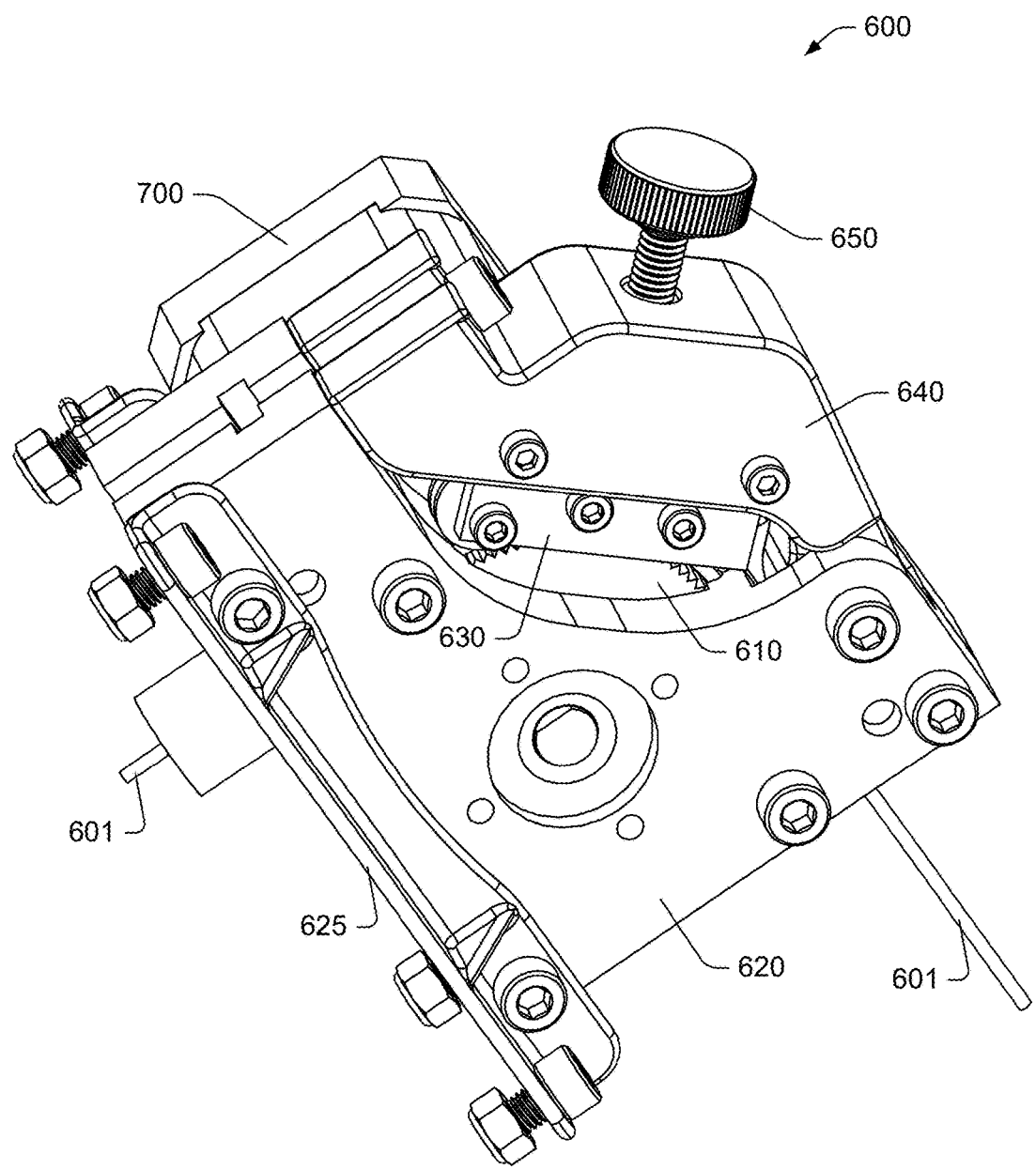
FIG. 8 is a perspective view of an example of an assembly.

FIG. 8 shows an example of the material transport assembly 600. In the example of FIG. 8, the material transport assembly 600 is configured to transport material 601, for example, in one direction or in multiple directions (e.g., forward and backward or bi-directionally). As shown, the material transport assembly 600 can include a component 610 that includes teeth where the component 610 is operatively coupled to a housing 620 that may include a mount 625, for example, to operatively couple the housing 620 (e.g., directly or indirectly) to a portion of an assembly (e.g., of a printer, etc.). Also shown in FIG. 8 is a guide 630 that may be operatively coupled to a fitting 640 that may fit to the housing 620 (e.g., optionally via a hinge mechanism).

As an example, the guide 630 may be biased via a biasing mechanism, for example, that biases the guide 630 with respect to the component 610 where the material 601 may be received therebetween. In such an example, the guide 630 may exert force that causes the material 601 to deform with respect to teeth of the component 610. For example, the guide 630 may exert force sufficient to cause notching of the material 601 by teeth of the component 610. As an example, teeth may be formations of the component 610 that extend radially outward, for example, to form peaks and valleys. In such an example, the peaks may, via application of force, penetrate material such as the material 601. As an example, material may deform, elastically, non-elastically, elastically and non-elastically, etc. As an example, teeth may permanently notch material.

As an example, non-elastic deformation of material can include plastic deformation of at least a portion of the material, for example, deformation that is irreversible (e.g., at ambient conditions, etc.). As an example, a material may undergo elastic deformation, which is reversible, followed by plastic deformation, which is irreversible. Soft thermoplastics have a rather large plastic deformation range as do ductile metals such as copper, silver, and gold. Steel does, too, but not cast iron. Hard thermosetting plastics, rubber, crystals, and ceramics have minimal plastic deformation ranges.

Under tensile stress, plastic deformation may characterized by a strain hardening region and a necking region and finally, fracture (also called rupture). During strain hardening material can become stronger through the movement of atomic dislocations. A necking phase may be indicated by a reduction in cross-sectional area of material. Under tensile stress, plastic deformation can end with fracture of the material.

As an example, a material under compressive stress due to loading, may exhibit various types of deformation. For example, the material may deform elastically followed by plastic deformation. As an example, a material may be characterized by its brittleness. As an example, a load or loads may be applied to material to plastically deform the material without, for example, breaking the material. As an example, consider a filament that is plastically deformed to form indents without breaking the filament into two or more pieces (e.g., the filament remains continuous, however, with indents).

As an example, a material may be loaded and creep in response to the load. Creep (or "cold flow") refers to the tendency of a solid material to move slowly or deform permanently under the influence of mechanical stress(es). As an example, a mechanism may load a filament to cause the filament to plastically deform, optionally at least in part via creep.

As an example, a mechanism may include a heater and/or a heated element. For example, consider a wheel with teeth where the wheel is heated and can transfer heat energy to a material that comes into contact with the teeth of the wheel. In such an example, the material may be loaded (e.g., via a guide wheel that may be spring biased). As an example, a material may be plastically deformed in a manner facilitated by heating. As an example, one or more toothed wheels and/or one or more guide wheels may be heated and configured to apply force to material that contacts such wheels. For example, consider a filament that travels in a gap between wheels where the filament is loaded and optionally heated to promote plastic deformation of the filament (e.g., via teeth in one or more of the wheels).

As an example, a mechanism may avoid brittle fracture of material (e.g., a type of fracture where no apparent plastic deformation takes place before fracture). As an example, a mechanism may avoid ductile fracture of material. As an example, ductile fracture may occur after some amount of plastic deformation (e.g., necking, etc.). As an example, a mechanism may avoid brittle fracture of material and avoid ductile fracture material. As an example, such a mechanism may be adjustable (e.g., controllable), for example, based at least in part on material behavior under load (e.g., and optionally under heating, etc.).

As an example, material may be provided that includes notches (e.g., indentations, etc.). As an example, material may be provided that includes a core and a layer disposed outwardly from the core where, for example, the layer may be include one or more material properties that allow for notch formation, for example, for transporting the material via a material transport assembly such as the material transport assembly 600 of FIG. 8. As an example, a core and a peripheral layer may differ in elasticity, for example, where the peripheral layer may allow for transport via a toothed component of a material transport assembly.

In the example of FIG. 8, the fixture 640 may include one or more biasing components that may act to bias the guide 630. As an example, the fixture 640 may be configured with an adjustment mechanism that may be configured to load one or more biasing components, for example, with respect to the guide 630. As an example, a tensioner 650 may be provided that can be adjusted to apply a load (e.g., a pre-load, etc.) to one or more biasing components that may bias the guide 630. As an example, an adjustment mechanism may be adjustable, for example, to accommodate one or more types of materials that may be transported by a material transport assembly. For example, the tensioner 650 may be adjusted based on hardness of the material 601. As an example, the tensioner 650 may be adjusted to achieve a desired notching (e.g., notch depth) of the material 601.

In the example of FIG. 8, the material transport assembly 600 includes a drive 700, for example, operatively coupled to the component 610. As an example, the drive 700 may be an electric motor that includes a shaft operatively coupled to the component 610, which may be a toothed wheel rotatable via the shaft (e.g., in one or more rotational directions). As an example, the drive 700 may be controlled by the control circuitry 250.

Figure 9:
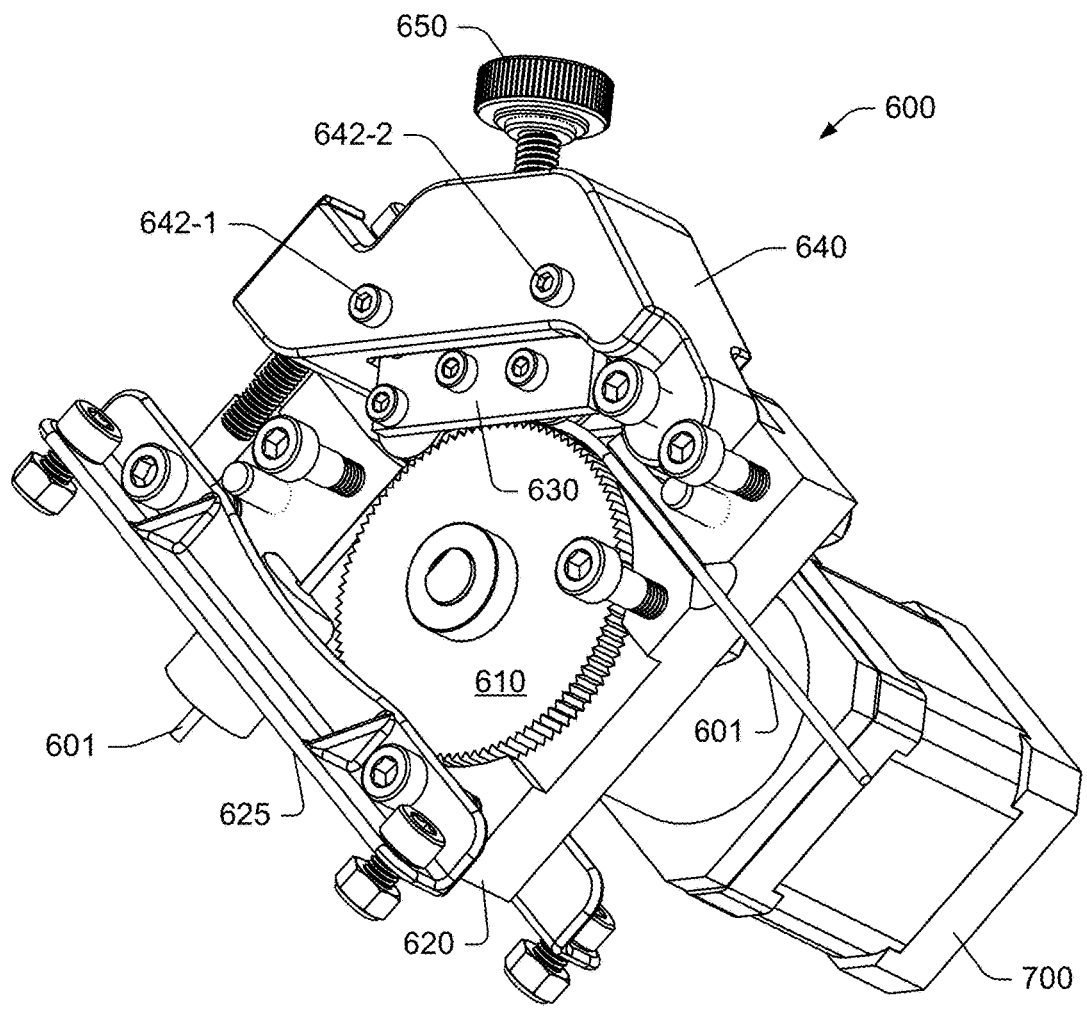
FIG. 9 is a perspective view of an example of a portion of an example of an assembly.

FIG. 9 shows an example of the material transport assembly 600 with a portion of the housing 620 removed. In the example of FIG. 9, the fixture 640 may receive rods 642-1 and 642-2 that may guide movement of the guide 630.

Figure 10A:
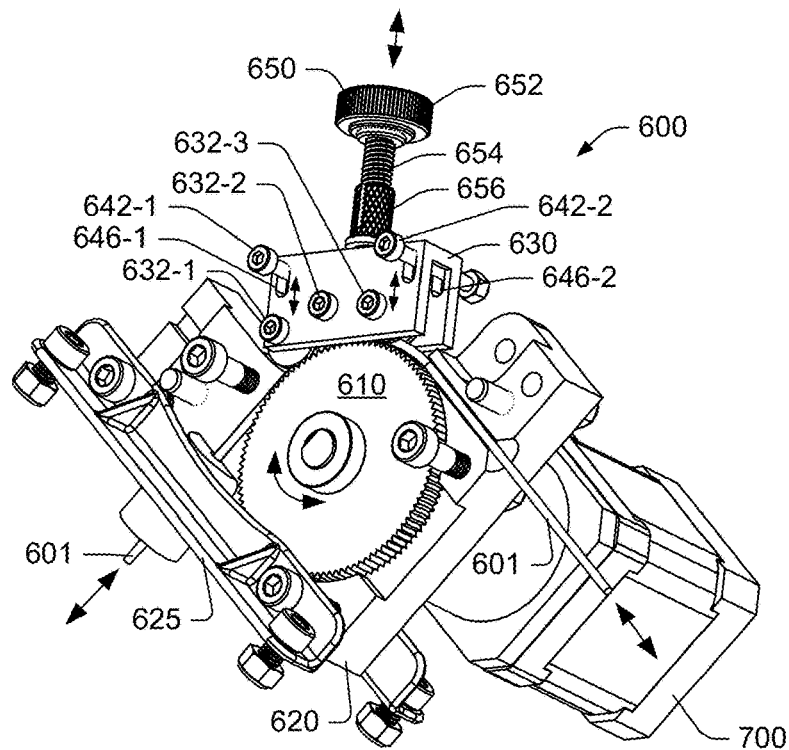
FIGS. 10A and 10B are a series of perspective views of examples of portions of an example of an assembly.
Figure 10B:
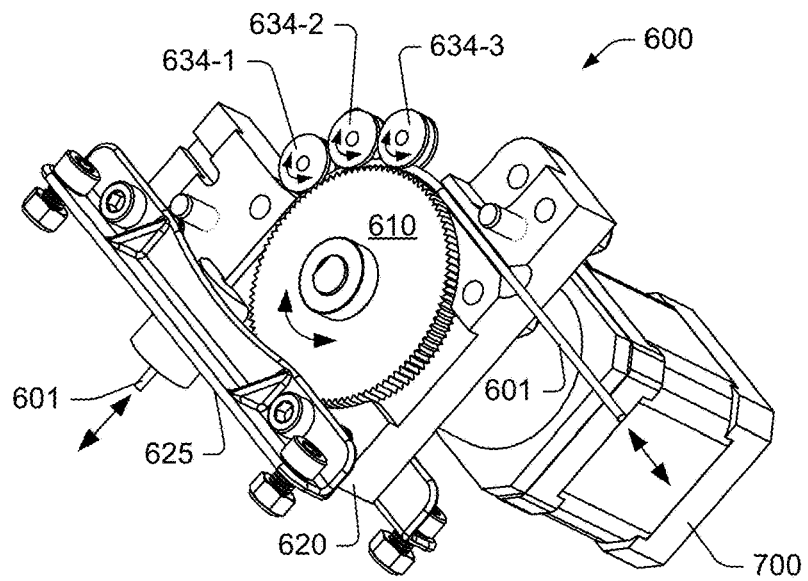

FIGS. 10A and 10B show additional examples of the material transport assembly 600 with various components removed. As shown, the guide 630 may include slots 646-1 and 646-2 that cooperate with the rods 642-1 and 642-2 to guide movement of the guide 630. As an example, the guide 630 may include axels 632-1, 632-2 and 632-3 for rollers 634-1, 634-2 and 634-3 that may exert force on the material 601, for example, to force the material 601 onto the component 610. As an example, the tensioner 650 may include a knurled head 652 coupled to a shaft 654 about which a biasing component 656 is disposed. As an example, one or more biasing components may be disposed with respect to the guide 630, for example, an upper surface of the guide 630. In such an example, the one or more biasing components may contact a surface of the fixture 640 where force exerted by the one or more biasing components act to force the axels 632-1, 632-2 and 632-3 downward toward the component 610, which forces the rollers 634-1, 634-2 and 634-3 downward toward the component 610.

FIG. 11A shows an example of a portion of the material transport assembly 600, particularly the component 610 and the rollers 634-1, 634-2 and 634-3. As an example, the material 601 may include a cross-sectional profile such as a circular profile or, for example, another shape profile (e.g., oval, polygonal, etc.).

FIG. 11A also shows angles $\Theta w$ and $\Theta m$, which may be selected as appropriate to transport material. As an example, the angle $\Theta m$ may be approximately 90 degrees while the angle $\Theta w$ may be a lesser angle, for example, approximately 45 degrees or less. As an example, a material transport assembly may include a guide that includes a single roller or a guide that includes multiple rollers. As an example, a material transport assembly may include multiple guides. As an example, a material transport angle may be selected, for example, based on a position of a supply, based on a position of a gantry, etc.

FIG. 11B shows an enlarged view of a portion of the component 610, the roller 634-1 and a portion of the roller 634-2. FIG. 11C shows a cross-sectional view along a line A-A with respect to the roller 634-1 and FIG. 11D shows a cross-sectional view along a line B-B with respect to the roller 634-1, along with an enlarged view of the material 601. As shown, a roller and/or a component may apply force to a material disposed therebetween, for example, to form notches in the material. As an example, once formed via transport of the material in one direction, the notches may be suitable for aid in transport of the material in an opposite direction. For example, notches may be formed by advancing the material toward a head and may be used for retracting the material.

As an example, a particular configuration may include the component 610 with one or more of the following dimension: diameter of about 50 mm, width of about 3 mm and a number of teeth of about 100. As an example, the foregoing configuration may include the rollers 634-1, 634-2 and 634-3 with one or more of the following dimensions: outer diameter of about 12 mm and groove diameter of about 10 mm. In such an example, the component 610 may transport a material (e.g., such as the material 601) that is biased by one or more of the rollers 634-1, 634-2 and 634-3 where, for example, the material is provided with a cross-sectional dimension (e.g., diameter) of about 1.75 mm (e.g., +/−0.05 mm). As an example, notches may be formed in such a material at least in part via force applied to the material as it is in contact with one or more of teeth of the component 610.

As an example, a component may be rotatable and may include features that can plastically deform a filament, for example, where the filament is biased between a material guide and the component. In such an example, the component may be a toothed component. As an example, a toothed component may be a toothed wheel.

As an example, a material transport assembly can include a toothed wheel that is driven (e.g., rotated by a drive, optionally bi-directionally) where material may contact the toothed wheel and where force is applied to the material while it is in contact with the toothed wheel to cause deformation of the material by teeth of the toothed wheel. As an example, such deformation may be permanent (e.g., at an operational temperature of the material transport assembly); noting that where material is transported to a head, the head may include a heater that "melts" the material such that it can change shape (e.g., to form an object, etc.).

As an example, a biasing force or biasing forces may be adjustable, for example, to achieve a desired effect on material being transported. As an example, one or more dimensions, one or more angles, etc., may be selected and/or adjusted, for example, to achieve a desired effect on material being transported (e.g., notching, integrity, etc.). As an example, the material 601 may include one or more polymeric materials (e.g., ABS, nylon, PET, PLA, polycarbonate, blends of polymers, PEEK, PEI, etc.). As an example, the material 601 may be or include a thermoplastic, optionally a high temperature thermoplastic.

As an example, a material transport assembly may provide for contacting material at two or more points. For example, consider an assembly that includes two rollers that are spaced over a distance, which may be, for example, defined by an angle. In such an example, the two rollers may contact a filament at a first point with respect to a first one of the two rollers and at a second point with respect to a second one of the two rollers. In such an example, the filament may be in contact with a component such as the component 610. While the foregoing example mentions two rollers, as indicated, an assembly may include more than two roller (e.g., at least two rollers).

As an example, a material transport assembly may provide for transport of a material such as a filament where the material forms an arc with respect to a component or components of the assembly. For example, as described with respect to the example of FIGS. 11A, 11B, 11C and 11D, one or more rollers may be provided that act to wrap a filament with respect to a drive component where the wrapping occurs over an arc (e.g., consider filament wrapping around the drive component over a continuous arc). In such an example, an assembly may provide for multiple points of contact of material with respect to components, which may act to enhance material "grip" (e.g., without undesirable material damage), reduce slide risk, etc.

As an example, a material transport assembly may be an extruder in that it may be used to extrude material, which may be a meltable material that is conveyed to a melt head. In such an example, if it is desired to reduce flow of molten material from the melt head, the material transport assembly may optionally be operated in a reverse transport direction to retract the material with respect to the melt head and thereby diminish or halt flow of molten material from the melt head.

As an example, an assembly may include rails; plates that include wheels that ride on the rails; a linear lead screw disposed at least in part between a pair of the plates; a drive operatively coupled to one of the plates of the pair of plates for rotation of the linear lead screw; and a carrier that includes a radial bearing that receives the linear lead screw for translation of the carrier in response to rotation of the linear lead screw. As an example, such an assembly may include a rod disposed at least in part between the pair of the plates where the carrier includes a bore that receives the rod.

As an example, in an assembly, a pair of plates may be a first pair of the plates, a linear lead screw may be a first linear lead screw, a drive may be a first drive and a radial bearing may be a first radial bearing. In such an example, the assembly may include a second pair of plates, a second linear lead screw disposed at least in part between the second pair of plates, a second drive operatively coupled to one of the plates of the second pair of plates for rotation of the second linear lead screw, and a second radial bearing of a carrier where the second radial bearing receives the second linear lead screw for translation of the carrier in response to rotation of the second linear lead screw. As an example, such an assembly may be a gantry for positioning the carrier, for example, an x,y gantry for positioning the carrier at one or more x,y coordinates. As an example, a carrier may include an anti-backlash mechanism (or anti-backlash mechanisms).

As an example, an assembly can include a toothed component; a drive for rotation of the toothed component; a guide; and a biasing component that biases the guide in a direction toward the toothed component. In such an example, the guide may include at least two rollers.

As an example, an assembly may include an adjustment mechanism that adjusts a load applied to a guide. As an example, a filament may be disposed between such a guide and a toothed component. In such an example, the filament may include notches formed by a biasing component that biases the guide in the direction toward the toothed component. As an example, an assembly may transport a filament to a head for formation of a multidimensional object.

As an example, a printer can include an x,y gantry that includes an x-direction linear lead screw, a y-direction linear lead screw and a carrier that receives the x-direction linear lead screw and the y-direction linear lead screw where rotation of the x-direction linear lead screw translates the carrier and the y-direction linear lead screw, where rotation of the y-direction linear lead screw translates the carrier and the x-direction linear lead screw and where the carrier includes a print head. In such an example, the print head may include a heater for heating material to decrease the viscosity of the material. As an example, a printer may include a material transport assembly. For example, consider a material transport assembly that includes a toothed component; a drive for rotation of the toothed component; a guide; and a biasing component that biases the guide in a direction toward the toothed component.

As an example, a printer may include an x-direction drive that rotates an x-direction linear lead screw and a y-direction drive that rotates a y-direction linear lead screw. As an example, a printer may include a carrier that includes an x-direction radial bearing that receives an x-direction linear lead screw and a y-direction radial bearing that received a y-direction linear lead screw.

As an example, a material transport assembly can include a toothed component; a drive for rotation of the toothed component; a material guide; and a biasing component that biases the material guide in a direction toward the toothed component. In such an example, the material guide can include at least two rollers.

As an example, a material transport assembly can include an adjustment mechanism that adjusts a load applied to a material guide. As an example, an assembly can include a material transport assembly and a filament disposed between a material guide and a toothed component of the material transport assembly. In such an example, the filament may be or include a printing material, for example, consider a printing material selected from a group consisting of a support material and a parent material. As an example, a filament can include notches formed by a biasing component biasing a material guide in the direction toward a toothed component. As an example, a material transport assembly may notch a filament and, for example, transport the notched filament to a head for formation of a multidimensional object (e.g., per a three-dimensional printing process). As an example, the material transport assembly may transport a filament in one of two directions, which may be determined at least in part by an arrangement of material guides with respect to a toothed wheel (e.g., which may determine how a filament is bent or angled and, for example, two directions of transport of a material transport assembly).

As an example, a method can include contacting a filament and a toothed component where a guide applies a biasing force to the filament; forming notches in the filament at least in part via the biasing force; and rotating the toothed component to transport the filament. In such an example, the filament can include a printing material (e.g., consider a support material or a parent material). As an example, a method can include forming notches in a filament by plastically deforming the filament.

As an example, a method may include rotating a toothed component in a clockwise direction and/or rotating the toothed component in a counter-clockwise direction.

As an example, a method may include controlling rotating of a toothed component via control circuitry of a three-dimensional printer.

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   contacting a filament and a toothed component wherein a guide applies a biasing force to the filament wherein the filament comprises a printing material, wherein the guide comprises multiple rollers that define an angle $\theta w$ as measured with respect to an axis of rotation of the toothed component for enhancing gripping of the filament by wrapping the filament in an arc on the toothed component over an angle $\theta m$ as measured with respect to the axis of rotation of the toothed component;
   forming notches in the filament at least in part via the toothed component and the biasing force; and
   rotating the toothed component to transport the filament to a print head of a printer.

2. The method of claim 1 wherein the printing material comprises a printing material selected from a group consisting of a support material and a parent material.

3. The method of claim 1 wherein the forming notches in the filament comprises plastically deforming the filament.

4. The method of claim 1 wherein the rotating the toothed component comprises rotating the toothed component in a clockwise direction.

5. The method of claim 4 further comprising rotating the toothed component in a counter-clockwise direction.

6. The method of claim 1 further comprising controlling the rotating of the toothed component via control circuitry of the printer that comprises the printing head wherein the printer comprises a three-dimensional printer.

7. The method of claim 1 comprising rotating the toothed component to retract the filament from the print head of the printer.

8. The method of claim 1 comprising receiving, at the print head, a portion of the filament that comprises the notches.

9. The method of claim 8 comprising extruding the portion of the filament via the print head.

10. The method of claim 9 wherein extruding comprises heating the portion of the filament to reduce its viscosity.

11. The method of claim 10 comprising forming at least a portion of a three-dimensional object with the extruded portion of the filament.

12. The method of claim 1 wherein the angle $\theta w$ is less than the angle $\theta m$.

13. The method of claim 1 wherein each of the multiple rollers comprises applies a respective portion of the biasing force to the filament.

14. The method of claim 13 wherein the biasing force applied by the guide is adjustable wherein adjusting the biasing force of the guide adjusts the respective portions of the biasing force applied by each of the multiple rollers to the filament.

* * * * *